E. WIRTH-FREY.
METHOD OF PRODUCING FOAM IN LIQUIDS.
APPLICATION FILED APR. 8, 1919.
1,351,089.
Patented Aug. 31, 1920.
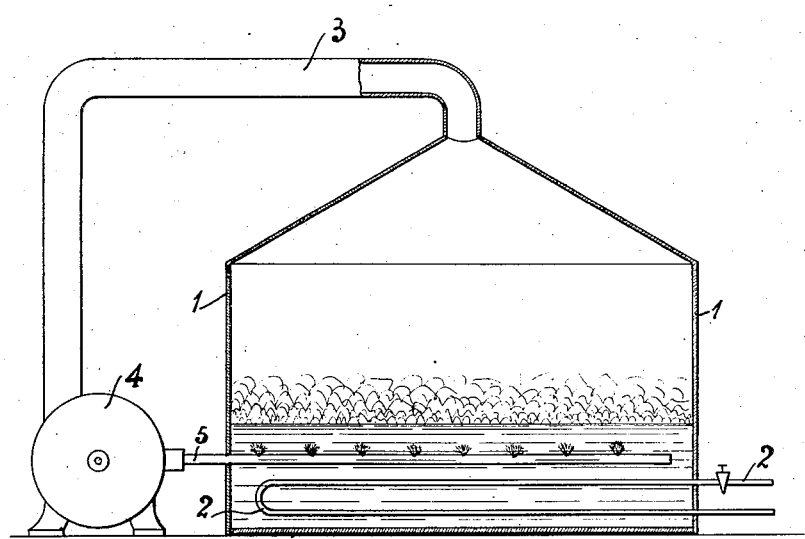
Inventor
Elias Wirth-Frey
by
his Attorney

UNITED STATES PATENT OFFICE.

ELIAS WIRTH-FREY, OF AARAU, SWITZERLAND.

METHOD OF PRODUCING FOAM IN LIQUIDS.

1,351,089.   Specification of Letters Patent.   Patented Aug. 31, 1920.

Application filed April 8, 1919. Serial No. 288,644.

*To all whom it may concern:*

Be it known that I, ELIAS WIRTH-FREY, a citizen of the Swiss Confederation, and residing at Aarau, Switzerland, have invented certain new and useful Improvements in Methods of Producing Foam in Liquids, of which the following is a specification.

The present invention has reference to a new and improved method for generating foam or froth in soapy or lixivious liquids. For causing such liquids to yield an abundance of foam it is now customary to either heat the liquid under treatment to the boiling point, or to forcibly introduce air into the unheated liquid. In the first instance a relatively large amount of heat must be supplied to keep up the continuous production of the required steam, while in the second instance there is the danger to be reckoned with that the introduced air may detrimentally act on the liquid.

The object of my invention is to improve on these prior procedures, and I accomplish my object by preventing escape of the steam rising from the treated liquid, drawing off this steam and pressing it back again into the liquid. In so doing I utilize a part of the heat contained in the steam for heating the liquid, and I accelerate and enhance the formation of foam by the forcible induction of the steam into the liquid, preventing thus at the same time the liquid from coming in contact with an unneutral agent.

My invention will be more readily understood when described in connection with the accompanying drawing which represents a diagrammatic elevation, partly in section, of an apparatus suitable for the purposes of my invention.

The liquid in the treating chamber 1, for instance lye, is suitably heated by outside heat, preferably as shown by a steam coil 2. The steam rising from the boiling liquid causes bubbles to form, and the resultant vaporous mixture is sucked off through the pipe 3 by the compressor 4 and is then reconducted into the liquid through pipe 5. By the described cycle the formation of froth is greatly furthered and intensified, inasmuch as on the one hand the heat contained in the sucked off steam is used over again for heating the liquid, and on the other hand the steam is used for strongly agitating the liquid. The cyclic operation may be repeated over and over until the required amount of foam is obtained.

For keeping up the operation only enough outside heat must be supplied as suffices to make up the loss through condensation, and the compression force need only be strong enough to overcome the pressure of the column of liquid in the treating chamber, both of which functions require relatively little energy. Inasmuch as the steam forced into the liquid is derived in the first instance from this very liquid it cannot in any manner act detrimentally on the latter.

What I claim is:—

1. The herein described method of producing foam by heating a liquid, which consists in drawing off the steam rising from the liquid under treatment and in reconducting it again under pressure into the liquid without contact with atmosphere.

2. The herein described method of producing foam by heating a liquid, which consists in heating the liquid to the boiling point, drawing off the steam rising from the liquid, forcibly introducing the withdrawn steam back again into the liquid without contact with atmosphere and continuing the cyclic operation as needed.

ELIAS WIRTH-FREY.